Aug. 1, 1967 — M. GAYRAL — 3,334,252
ASYNCHRONOUS ELECTRIC MOTORS
Filed Dec. 14, 1964
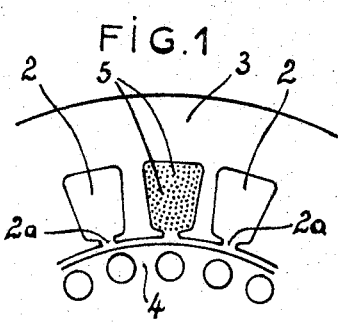
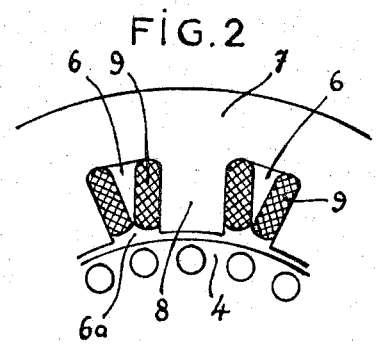
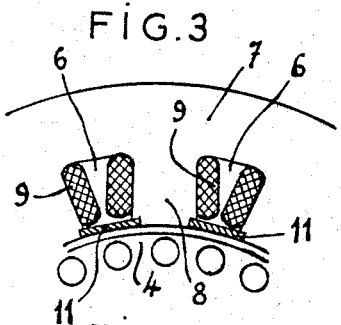
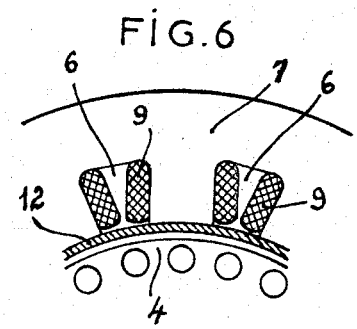
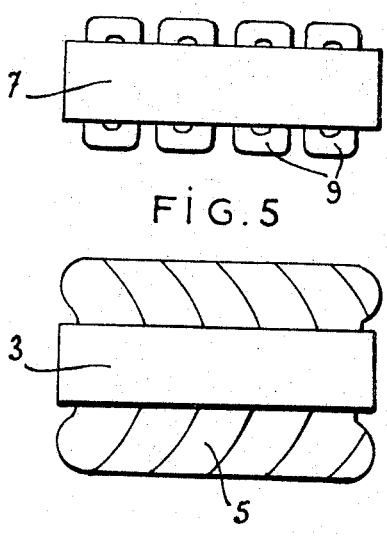
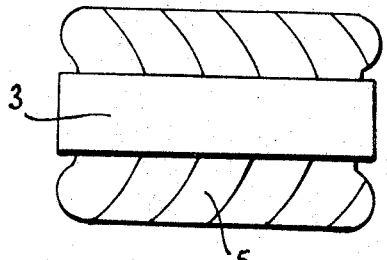
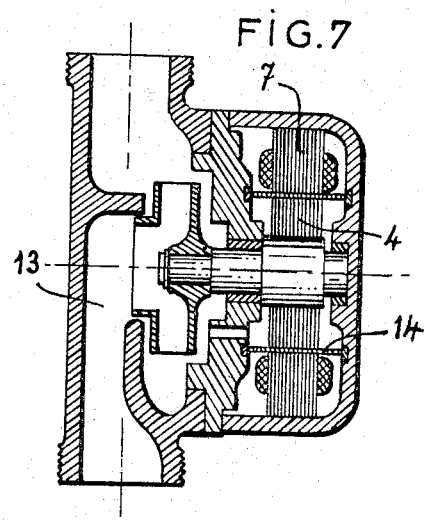
INVENTOR
MARCEL GAYRAL
BY Irwin S. Thompson
ATTORNEY United States Patent Office 3,334,252
Patented Aug. 1, 1967

3,334,252
ASYNCHRONOUS ELECTRIC MOTORS
Marcel Gayral, Lyon, France, assignor to Julien & Mege, Lyon, France, a company of France
Filed Dec. 14, 1964, Ser. No. 418,164
Claims priority, application France, Feb. 21, 1964, 44,494, Patent 1,394,963
7 Claims. (Cl. 310—214)

Asynchronous electric motors include a stator having a large number of slots to accommodate a winding known as "distributed."

The principal advantage of this type of stator is that it allows the copper required for the winding to be housed in a stator of minimal diameter, for which purpose the wires have to be placed in the slots practically one by one. In practice the openings of such slots are small so that the area of the stator poles facing the rotor may be the largest possible, the placing of the winding being thus particularly delicate for motors whose rotor is of small diameter, and necessarily a long and costly operation.

The present invention whose object is to eliminate this drawback, concerns an improvement to asynchronous electric motors, whether of the squirrel-cage type or not, according to which the number of slots in the stator is as small as possible consistent with the installation of the winding by engagement of prefabricated coils with one or more poles, the openings of the slots being filled with a magnetic material after the fitting of these coils.

This arrangement has the advantage of allowing rapid construction of the stator whilst avoiding reduction of area of the stator poles facing the rotor.

The mounting of the coils upon the poles necessitates large passages between the latter, and furthermore the use of prefabricated coils prevents a satisfactory filling thereby of the spaces between the poles. The manufacturer is therefore forced to make the stator of larger external diameter than is the case with a conventional motor. This disadvantage, however, is compensated for by the fact that, since the coils do not overlap one another, the length of the stator can be reduced to a very considerable extent.

The magnetic bridges closing the openings of the slots or gaps between the poles are advantageously formed of a sintered material having a large proportion of free internal surfaces and a high reluctance and high electrical resistance and high resistance to the flow of eddy currents in all directions.

In a preferred embodiment of the invention, the magnetic bridges between the poles are represented by a single cylindrical ring of sintered material inserted in the bore of the stator.

The invention will readily be understood from the following description with reference to the accompanying schematic drawing which shows, by way of example only, several constructions of asynchronous electric motors embodying the present invention.

FIG. 1 is a fragmentary transverse section of a conventional asynchronous motor;

FIG. 2 is a similar view of an asynchronous motor whose stator winding includes one coil per pole;

FIGS. 3 and 4 are respectively a fragmentary transverse section and a side elevation of an asynchronous motor improved in accordance with the invention;

FIG. 5 is a side elevation of a conventional asynchronous motor similar to that shown in FIG. 1;

FIG. 6 is a fragmentary transverse section of an asynchronous motor showing an alternative construction according to the invention;

FIG. 7 is a sectional side elevation of an asynchronous motor according to the invention and shown arranged for driving a circulating pump without a stuffing-box.

In the conventional squirrel-cage asynchronous motor illustrated in FIG. 1, the slots 2 of the stator 3 are very close together and their openings 2a are considerably reduced so that intervening poles present a maximum area to the rotor 4, the cross-section of the slot 2 being very precisely calculated as a function of the total cross-section of the conductors 5 to be lodged therein. As this figure shows, it is necessary in practice to introduce the conductors 5 one by one into the grooves 2 so that their installation takes a long time.

The known arrangement shown in FIG. 2 facilitates installation of the stator winding, since in this case, the slots 6 of the stator 7 are equal in number to the poles and their openings 6a are wide enough to allow the engagement of a prefabricated coil 9 with each pole 8. However, as this figure shows, the area of the poles of the stator 7 facing the rotor 4 is considerably diminished, with a consequent enormous reduction in the power of the motor. Furthermore, the slots or spaces between the poles 8 are not completely filled which in turn considerably increases the size of the stator.

FIG. 3 shows a first embodiment of the present invention. Bridges 11 of magnetic material are inserted between the ends of the poles 8 of the stator 7 so as to close the openings 6a of the grooves 6.

This improvement permits the area of the poles 7 facing the rotor 4 to be restored to a maximum value whilst providing for retention of a stator winding formed by the polar coils 9.

To minimize the formation of eddy currents in the magnetic bridges 11, the latter are advantageously formed of a sintered material having a large proportion of free internal surfaces and a high reluctance and high electrical resistance and high resistance to the flow of eddy currents in all directions.

The above-mentioned drawback of increased stator diameter of the stator which necessitates a reduction in the number of slots is compensated for by the fact that, since the coils of the winding no longer overlap one another, their heads are considerably less cumbersome, as is shown by comparing the inmproved stator of FIG. 4 with the conventional stator of FIG. 5, and this enables the length of the motor to be considerably reduced.

FIG. 6 shows a particularly advantageous construction of an asynchronous motor embodying the present invention.

In this embodiment, the magnetic bridges between the poles are not formed individually as at 11, but as a cylindrical ring 12 inserted in the bore of the stator 7. It can naturally be more rapidly placed in position than the separate elements 11.

A particularly interesting application of the motor of FIG. 6 is shown in FIG. 7, the motor here being used to drive a circulating pump indicated generally at 13. This pump is of the type without a stuffing-box; that is to say, having a flooded rotor.

In this type of pump, the water-tightness of the enclosure around the rotor 4 is generally ensured by an impervious membrane 14.

The use of the motor shown in FIG. 5 has the advantage that the watertight membrane 14 can be replaced by the sintered ring 12 which forms the magnetic bridge between poles.

This arrangement obviously allows the radial gap to be reduced by an amount corresponding to the normal thickness of the watertight membrane currently used. Furthermore, in this application, the reduced length of the motor which the invention allows is by no means a negligible improvement, since it controls the "overhang" of the unit in relation to the pipes.

As will be obvious the invention is not limited to the embodiments which have been described above by way of example only; on the contrary, it includes all variations of such embodiments.

I claim:

1. In an asynchronous electric motor, an annular stator, inwardly-directed poles defined by radial slots in the inner periphery of said stator, preformed coils mounted upon said poles, and sintered magnetic material having a large proportion of free internal surfaces and a high reluctance and high electrical resistance and high resistance to the flow of eddy currents, said material being disposed in the bore of said stator to bridge the openings of said slots.

2. In an asynchronous electric motor, an annular stator, inwardly-directed poles defined by radial slots in the inner periphery of said stator, preformed coils mounted upon said poles, and bridges of sintered magnetic material mounted across the openings of said slots so as partially to define the inner periphery of said stator, said sintered magnetic material having a large proportion of free internal surfaces and a high reluctance and high electrical resistance and high resistance to the flow of eddy currents.

3. In an asynchronous electric motor as claimed in claim 2, said bridges of sintered magnetic material being fitted flush with the free ends of said poles so as to retain said coils in said slots.

4. In an asynchronous electric motor, an annular stator, inwardly-directed poles defined by radial slots in the inner periphery of said stator, preformed coils mounted upon said poles without mutual overlapping in a direction circumferentially of said stator, and sintered magnetic material bridging the openings of said slots to retain said coils in position, said sintered magnetic material having a large proportion of free internal surfaces and a high reluctance and high electrical resistance and high resistance to the flow of eddy currents.

5. In an asynchronous electric motor, an annular stator, inwardly-directed poles defined by radial slots in the inner periphery of said slots, preformed coils mounted upon said poles, and a ring of sintered magnetic material fixed to the inner periphery of said stator so as to bridge the openings of said slots and to retain said coils in position, said sintered magnetic material having a large proportion of free internal surfaces and a high reluctance and high electrical resistance and high resistance to the flow of eddy currents.

6. An asynchronous electric motor comprising an annular stator, inwardly-directed poles defined by radial slots in the inner periphery of said stator, preformed coils mounted upon said poles, a casing enclosing said stator, a rotor journalled in said casing concentrically with said stator, a fluid impeller connected to said rotor and disposed within a pump chamber communicating with the interior of said casing, and a ring of sintered magnetic material fixed to the inner periphery of said stator so as to retain said coils in position on said poles and serving to protect them from contact with fluid entering said casing from said pump chamber, said sintered magnetic material having a large proportion of free internal surface and a high reluctance and high electrical resistance and high resistance to the flow of eddy currents.

7. An asynchronous electric motor comprising an annular stator, inwardly-directed poles defined by radial slots in the inner periphery of said stator, preformed coils mounted upon said poles, a casing enclosing said stator, a rotor journalled in said casing concentrically with said stator, a fluid impeller connected to said rotor and disposed within a pump chamber communicating with the interior of said casing, and a circumferential partition in said chamber separating the stator- and rotor-containing parts thereof in a fluid-tight manner and formed of a sintered magnetic material which engages the free ends of said poles and serves to locate said coils therein, said sintered magnetic material having a large proportion of free internal surfaces and a high reluctance and high electrical resistance and high resistance to the flow of eddy currents.

References Cited
UNITED STATES PATENTS

| | | | |
|---|---|---|---|
| 2,451,633 | 10/1948 | Perrigo | 310—214 |
| 2,939,399 | 6/1960 | Rutschi | 310—63 |
| 2,961,716 | 11/1960 | Luenberger | 310—86 |
| 3,119,342 | 1/1964 | White | 310—63 |

MILTON O. HIRSHFIELD, *Primary Examiner.*

L. L. SMITH, *Assistant Examiner.*